(12) United States Patent
Sun et al.

(10) Patent No.: US 8,470,277 B2
(45) Date of Patent: Jun. 25, 2013

(54) SELECTIVE CATALYTIC $NO_x$ REDUCTION PROCESS AND CONTROL SYSTEM

(75) Inventors: William H. Sun, Lisle, IL (US); Paul G. Carmignani, Naperville, IL (US)

(73) Assignee: Fuel Tech, Inc., Warrenville, IL (US)

( * ) Notice: Subject to any disclaimer, the term of this patent is extended or adjusted under 35 U.S.C. 154(b) by 0 days.

(21) Appl. No.: 13/568,411

(22) Filed: Aug. 7, 2012

(65) Prior Publication Data

US 2013/0039827 A1    Feb. 14, 2013

Related U.S. Application Data

(60) Provisional application No. 61/521,993, filed on Aug. 10, 2011.

(51) Int. Cl.
| | | |
|---|---|---|
| B01D 53/56 | (2006.01) | |
| B01D 53/74 | (2006.01) | |
| B01D 53/76 | (2006.01) | |
| G05D 7/00 | (2006.01) | |

(52) U.S. Cl.
USPC .............. 423/239.1; 423/DIG. 5; 422/105; 422/111; 422/168; 422/177

(58) Field of Classification Search
USPC ............... 423/239.1, DIG. 5; 422/105, 111, 422/168, 177
See application file for complete search history.

(56) References Cited

U.S. PATENT DOCUMENTS

| | | | | |
|---|---|---|---|---|
| 7,090,810 | B2 * | 8/2006 | Sun et al. | 423/235 |
| 7,615,200 | B2 * | 11/2009 | Lin et al. | 423/239.1 |
| 2011/0002830 | A1 * | 1/2011 | Sun et al. | 423/239.1 |
| 2012/0288952 | A1 * | 11/2012 | Sun et al. | 436/113 |

\* cited by examiner

Primary Examiner — Timothy Vanoy
(74) Attorney, Agent, or Firm — Thaddius J. Carvis

(57) ABSTRACT

A process and an apparatus enhance urea utilization for selective catalytic reduction (SCR) of $NO_x$, by controlled preparation and feed of gasified urea during combustor load variation. The concentration of $NO_x$ in the combustion gases and a required total gas flow necessary to supply an SCR reactor with $NO_x$ reducing and carrier gases are determined. Urea is gasified by gasification gases in a thermal gasification reactor. The resulting urea gasification products are mixed with carrier gases to provide an injection grid supply stream. Heating is reduced and flue gas enthalpy is efficiently used by controls utilizing monitoring the temperatures of gases fed to the thermal gasification reactor and of the stream of carrier gases.

20 Claims, 1 Drawing Sheet

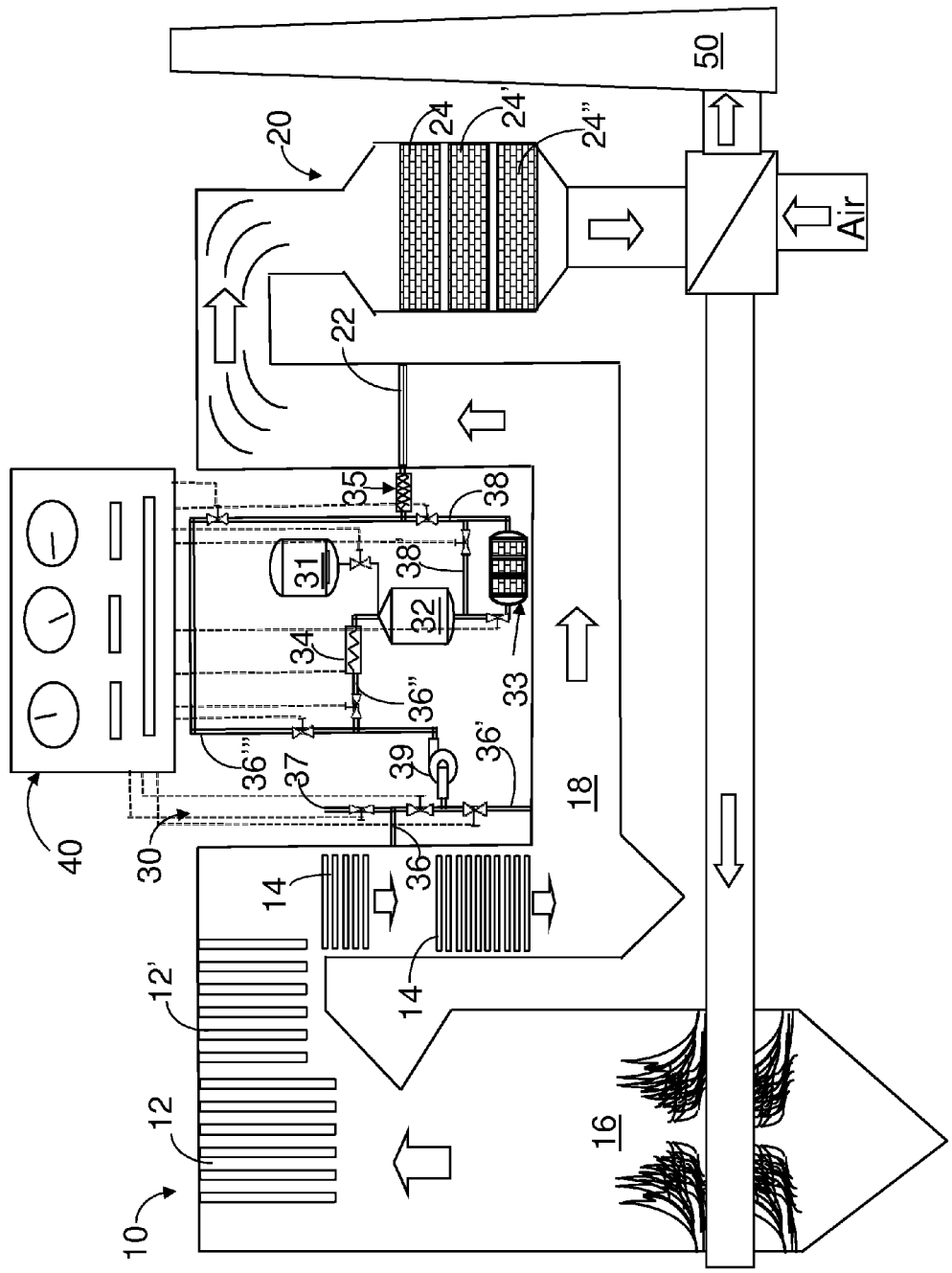

SELECTIVE CATALYTIC $NO_x$ REDUCTION PROCESS AND CONTROL SYSTEM

This application claims priority to U.S. Patent Application No. 61/521,993 filed Aug. 10, 2011, which application is hereby incorporated herein in its entirety.

FIELD OF THE INVENTION

The invention relates generally to the efficient utilization of urea for selective catalytic reduction (SCR) of $NO_x$, and more particularly to controlling the preparation and feed of a gasified product of the urea to an SCR unit treating the effluent from a power unit subject to significant load variation.

BACKGROUND OF THE INVENTION

Power units are required that can provide economical power generation in many situations, including those with wide demand fluctuations. And, pollution control measures must be available to operate effectively despite these fluctuations.

Demand for power can vary over time because of localized issues or because of seasonal changes. When demand fluctuates for an individual unit supplying power to a generator, the low demand operations will generally produce lower effluent temperatures than operations at high load. Demand often fluctuates in the summer when air conditioning adds to the demand of industrial uses. At night, demand will typically be lower than during the day; but because $NO_x$ is generally a problem whenever air conditioning is in demand, even the relatively lower $NO_x$ production at night must be effectively addressed.

Unfortunately, while $NO_x$ reduction technologies have been developed to the extent that air pollution can be effectively controlled regardless of the season, the wide load fluctuations that accompany heavy seasonal demand, can stress the systems. The problem is partly due to the sheer volume of $NO_x$ being generated and partly due to the temperature sensitivity of SNCR (selective non-catalytic reduction) systems and SCR (selective catalytic reduction) systems. Both are limited in effectiveness to specific temperature windows, and the flue gases generated by regulated combustors must be treated within those windows.

SCR has been proven to be highly effective for $NO_x$ reduction, and SCR units can generally be scaled to the size required for peak generation units, such as package boilers Diesel engines, turbines and the like. However, SCR units typically require the use of ammonia as a reducing reagent, and it is a common problem that ammonia is difficult and dangerous to store, especially in populated areas. Advantageously, urea gasification units such as described in U.S. Pat. No. 7,090,810 to Sun, et al., can be effectively employed, but their control during fluctuating load can be a serious problem. These systems may draw process gases as ambient air or as combustion gases from the combustor, typically from a single location where the gas temperature is desirably economical for gasification. The effluent should be hot enough to achieve full gasification with minimal heating, but low loads produce temperatures lower than required for optimal operation.

Once gasified, the gases produced are typically fed to the SCR units by means of ammonia injection grids (AIGs), which are essentially arrays of distribution pipes with holes arranged through which the ammonia is preferably ejected. Where demand is low, the volume of gasified urea will also decrease and will not, by itself, be sufficient to provide sufficient momentum for the gas and thereby achieve uniform distribution for $NO_x$ reduction.

There is a particular need for a process and an apparatus which convert urea to an ammonia-containing gas, yet maintain the ability to fully control the operation of a SCR unit regardless of demand for power.

SUMMARY OF THE INVENTION

The present invention provides a process and an apparatus for reducing the concentration of nitrogen oxides in combustion gases produced by a combustor operating with variations in load.

The process employs gasified urea and an SCR reactor (a reactor with a selective catalytic $NO_x$ reduction catalyst), and includes the following steps: determining the concentration of $NO_x$ in the combustion gases, determining a required total gas flow necessary to supply the SCR reactor with $NO_x$-reducing and carrier gases to be supplied by an injection grid to reduce $NO_x$ in the combustion gases to a predetermined level, feeding aqueous urea and gasification gases to a urea gasification unit in amounts sufficient to produce a $NO_x$-reducing gas stream comprising urea gasification products in amounts sufficient to reduce $NO_x$ in the combustion gases, mixing the $NO_x$-reducing gas stream comprising urea gasification products with a stream of carrier gases to provide a grid supply gas stream, and feeding the grid supply gas stream to an injection grid; and further including the steps of determining the temperature of the gasification gases fed to the urea gasification unit and the temperature of the stream of carrier gases, and heating the gasification gases fed to the urea gasification unit as necessary to assure that the grid supply gas stream is of a temperature sufficient to reduce $NO_x$ in the SCR reactor.

The apparatus employs means for gasifying urea and an SCR reactor including a selective catalytic $NO_x$-reduction catalyst, and includes the following means: means for determining the concentration of $NO_x$ in the combustion gases, means for determining a required total gas flow necessary to supply the SCR reactor with $NO_x$-reducing and carrier gases to be supplied by an injection grid to reduce $NO_x$ in the combustion gases to a predetermined level, means for feeding aqueous urea and gasification gases to a urea gasification unit in amounts sufficient to produce a $NO_x$-reducing gas stream comprising urea gasification products in amounts sufficient to reduce $NO_x$ in the combustion gases, means for mixing the $NO_x$-reducing gas stream comprising urea gasification products with a stream of carrier gases to provide a grid supply gas stream, and means for feeding the grid supply gas stream to an injection grid; and further including means for determining the temperature of the gasification gases fed to the urea gasification unit and the temperature of the stream of carrier gases, and means for heating the gasification gases fed to the urea gasification unit as necessary to assure that the grid supply gas stream is of a temperature sufficient to reduce $NO_x$ in the SCR reactor.

In one embodiment, a stream of combustion gases is withdrawn from one or more predetermined locations on a combustor operated at a range of loads from low to high, wherein the combustion gases can vary within a range of at least about 200° F., in some cases about 400° F., between low load and high load.

In another embodiment, the $NO_x$-reducing gas stream comprising urea gasification products is fed through a hydrolysis catalyst to convert all urea-derived nitrogen species in the gases to ammonia.

In yet another embodiment, the gasification gases fed to the urea gasification unit and the stream of carrier gases are withdrawn from one or more predetermined locations on a combustor operated at a range of loads from low to high, wherein the combustion gases can vary within a range of at least about 200° F., in some cases as much as 400° F., between low load and high load. According to this embodiment, when the combustion gases as withdrawn are below about 400° F., the gasification gases fed to the urea gasification unit are heated as necessary prior to feeding to the urea gasification unit and the gas stream comprising urea gasification products is fed through a hydrolysis catalyst to convert all urea-derived nitrogen species in the gases to ammonia to produce a $NO_x$-reducing gas stream. In another aspect of this embodiment, the combustion gases as withdrawn are at a temperature above about 800° F. In yet another aspect of this embodiment, the gases as withdrawn between about 400° F. and about 800° F., and the gasification gases fed are heated as necessary prior to feeding to the urea gasification unit.

In a further embodiment, the process will sense the temperature of the stream of combustion gases withdrawn from a predetermined location on the combustor and select from one of the following options: (a) the gases as withdrawn are at a temperature above about 800° F., (b) the combustion gases as withdrawn are between about 400° F. and about 800° F., and the gasification gases fed to the urea gasification unit are heated as necessary prior to feeding to the urea gasification unit, (c) the combustion gases as withdrawn are below about 400° F., the gasification gases fed to the urea gasification unit are heated as necessary prior to feeding to the urea gasification unit and the $NO_x$-reducing gas stream comprising urea gasification products is fed through a hydrolysis catalyst to convert all urea-derived nitrogen species in the gases to ammonia.

DESCRIPTION OF THE DRAWINGS

The accompanying drawings, which are incorporated in and constitute a part of the specification, illustrate presently preferred embodiments of the invention, and together with the general description given above and the detailed description of the embodiments given below, serve to explain the principles of the invention. As shown throughout the drawings, like reference numerals designate like or corresponding parts.

FIG. 1 is a schematic flow diagram of an embodiment of the process and apparatus of the invention.

DETAILED DESCRIPTION OF THE INVENTION

The invention provides a process and apparatus for reducing the concentration of nitrogen oxides in combustion gases produced by a combustor operating with variations in load, by a selective catalytic $NO_x$ reduction catalyst effective for utilizing gasified urea.

The process and apparatus have several advantages and benefits. First, the total heat addition is decreased in an SCR process utilizing urea as the reagent in place of ammonia. Along this line, but distinct and significant, the flue gas enthalpy is very effectively utilized. Importantly, the size of the urea gasification equipment can be decreased. And, because system control is improved overall, the equipment components are better protected from damage. The logic of the process, which is aided by computer control, preferably with feed forward and feedback measures, will control the heat input and the utilization of flue gas enthalpy to achieve major advances in process reliability and economy.

FIG. 1 schematically illustrates a combustor 10 of the type used for power generation. It is shown with an SCR unit 20, which is supplied with a $NO_x$ reducing gas stream by urea gasification unit 30 and carrier gases as will be described in greater detail later. A control system 40 is employed to control the $NO_x$ reduction operations prior to exhaust being discharged to the atmosphere via stack 50.

The combustor 10 illustrated is representative of the many types that can be employed and is not meant to be limiting. Indeed, the invention has applicability to package boilers, incinerators, industrial processes, Diesel engines and turbines, as well as full-scale boilers, which are useful for supplemental, peak power supplies. In the case illustrated, heat exchange tubes 12, 12' and 14 and 14' are illustrated as means to effectively utilize the heat produced by burning fuel and air in flame zone 16. The combustion gases are passed from the flame zone to the SCR reactor 20 via duct 18. The large, block arrows indicate direction of gas flow.

It is important to the operation of an SCR unit while avoiding the use of ammonia, that urea or a precursor be gasified and maintained gasified until used successfully in the SCR unit.

The term "urea" is meant to include the reagents that are equivalent to urea in the sense that they form ammonia and HNCO when heated, whether or not they contain large amounts of the pure chemical urea in the form introduced into the combustion gases; however, the reagents that are equivalent to urea typically contain measurable quantities of urea in their commercial forms and thus comprise urea. The term "urea" is meant to encompass urea in all of its commercial and equivalent forms. Reference is made to U.S. Pat. No. 7,090,810 in this regard.

Typically, commercial forms of urea will consist essentially of urea, containing 95% or more urea by weight. This relatively pure form of urea is preferred and has several advantages in the process of the invention. The urea is preferably supplied to the process as an aqueous solution with a urea concentration of from about 10 to about 60%, e.g., about 30 to about 50%, by weight.

When aqueous urea is heated, a number of chemical reactions, controlled by temperature-dependent rate constants, determine how urea is broken down:

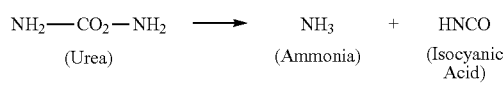

This reaction can occur at a temperature of 275° F.; but the HNCO, unless hydrolyzed or maintained very hot can form solid byproducts that can deposit on equipment and foul catalysts. The HNCO can convert as follows:

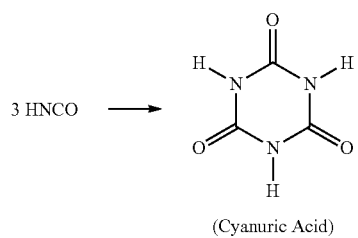

Cyanuric acid, if formed (and it is likely to form) can form polymers if temperatures are not properly controlled or the isocyanic acid is not fully hydrolyzed.

The full conversion of urea to ammonia can involve the following reactions, but not all are desirable and efforts should be made to moderate or eliminate their negative effects:

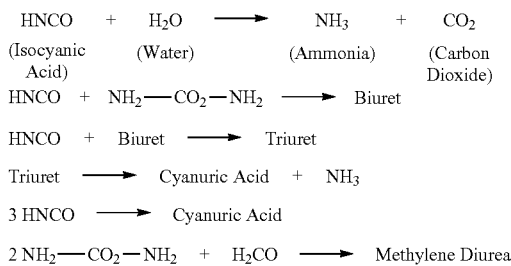

These reactions are rate dependent as well as dependent on the physical form of the reactants, the prevailing temperature, the time in the reactor and the presence or absence of water and/or a catalyst.

When urea is gasified by a thermal treatment alone, such as in thermal reactor 32, the resulting gas will contain ammonia and it can also contain isocyanic acid (HNCO), which can require high temperatures to avoid byproduct formation or other side reactions. Thus, a gasified product at this stage is useful for higher temperatures, but may not be suitable as such for low-temperature processes. The invention has the advantage that this product can be effectively utilized in some process situations where high temperatures dominate at high load as well as low-temperature operations that would ordinarily cause problems.

The gas stream from thermal gasification processes includes air or post-combustion gases, any water in the air, gases or urea solution, and urea decomposition products of HNCO and $NH_3$. If this thermal decomposition gas stream temperature is too low, e.g., approaching 290° F., the HNCO and $NH_3$ can combine to form a condensable solid (urea) that will be present as an aerosol or a deposit on cooler surfaces. The invention monitors the temperatures and relative amounts of the components in the thermal decomposition gas stream materials to determine if a second stage catalytic hydrolysis reactor is necessary. This second stage conversion, if necessary, can reduce the risk of recombination or byproduct formation at low temperature, allowing for operation of the gasification system in applications requiring low temperatures.

The addition of a second stage catalyst reactor to a urea gasification system allows reagent that has been decomposed in the first stage to be delivered at relatively low temperatures (less than approximately 380° F.) when necessary without the risk of recombination and condensation as smoke or deposit on a cool surface.

Urea gasification unit 30 is illustrated schematically, and reference is made to U.S. Pat. No. 7,090,810 and U.S. patent application Ser. No. 13/455,459, both of which are hereby incorporated by reference in their entireties, including the full texts of all references cited therein. Briefly, the urea gasification unit 30 will be supplied aqueous urea from tank 31. The urea is employed as an aqueous solution and flows through the unnumbered lines shown as single-weight lines with valves (⋈) to thermal urea gasification reactor 32 wherein it is contacted with gasification gases to produce urea gasification products that can be passed through a hydrolysis catalyst 33 to convert all urea-derived nitrogen species in the gases to ammonia or directly mixed with a carrier gas via mixer 35. As explained in U.S. patent application Ser. No. 13/455,459, the addition of a hydrolysis catalyst becomes useful where the gasification products are needed for temperatures below about 400° F. to 600° F., with an average of about 500° F. It is noted that all temperatures herein are approximations based on predicted averages and may vary by as much as 100° F., either way. The controller 40, will measure temperatures as well as flow rates in each line or device as will be necessary to achieve full gasification of the urea and transporting the resulting gas stream to SCR reactor 20 regardless of the load on combustor 10.

Process gas ducts within gasification unit 30 are shown as double-lined lines and are typically insulated as necessary to protect the gases therein as well as personnel working in their vicinity. These double-lined drawing elements represent process gas flow ducts for effluent and or outside air (line 37) as used for processing the urea to urea gasification products in thermal reactor 32 and hydrolysis catalyst 33 as called for by the controls. A heater 34 will be available on demand of the controller 40, when control parameters call for heat at this stage in processing. Lines 36 and 36' draw process gas from the combustor 10 or combustor duct 18 responsive to signals processed by the controller 40. In like manner ambient gases can be drawn in via line 37 to save process heat where the controller 40 calculates that as effective. It is an advantage of the invention that flue gas is preferably available from the combustor at a plurality of locations and controller 40 selects the location to provide a suitable temperature. When the flue gas temperature in duct 18 is at or above about 1100° F., a cooler source of flue gas should, in many cases, be selected and ambient gases can be drawn in via line 37 to avoid potential damage to equipment if not specifically designed for such high temperature operation. A blower 39 (others may also be employed) enables maintenance of desired flow rates.

The temperature of the process gas as withdrawn from duct 18 at any given location can vary widely over time, e.g., by over 200° F., and sometimes by as much as 400° F., depending on the load demanded of the combustor. The process gases in lines 36 and 36' from duct 18 can be directed by proper valve selection to either branch 36" for introduction into thermal reactor 32 or bypass branch 36"' as carrier gas fed to mixer 35 for combining with urea gasification products from line 38.

According to the basic operation of the invention, the process will entail a step of determining the concentration of $NO_x$ in the combustion gases, and the apparatus will include the means to achieve this. The careful control of $NO_x$ in the final effluent from stack 50 requires acquiring good data on the $NO_x$ concentration in the combustion gases to be treated as well as in the stack. This can be accomplished with meters of known type with sensors positioned prior to the SCR unit 20 and downstream of it, with the resulting signal data sent to the controller 40 for processing. The controller 40 can be a programmable digital controller, which receives signals representative of necessary process temperatures, flow rates, and the like, then compares them to stored values and determines an option best suited to the process, and sends operating signals to the various valves, heaters and pumps necessary for process effectiveness. The drawing illustrates some control transmission lines by dashed lines. Not all are illustrated. Providing measured $NO_x$ concentrations as a control parameter will aid in guarding against either over treatment or under treatment. In some cases, the $NO_x$ measurements can be used for feedback control following initial treatments being based on preprogrammed values.

The process of the invention will also entail determining the amount of total gas flow that is necessary to supply the SCR reactor 20 with $NO_x$ reducing gases, e.g., via line 38, and carrier gases, e.g., via line 36''', from an injection grid 22 to reduce $NO_x$ in the combustion gases to a predetermined level. The controller 40 will also determine the amount of aqueous urea from tank 31 and gasification gases, e.g., from line 36' that must be fed to thermal urea gasification reactor 32. The amounts of each fed must be sufficient to produce a gas stream comprising urea gasification products in amounts sufficient to reduce $NO_x$ in the combustion gases in duct 18 via SCR reactor 20. As will be explained, the gasification products from thermal reactor 32, can be passed as such to the mixing device 35 via lines 38' and 38 for mixing the gas stream comprising urea gasification products with a stream of carrier gases to provide a grid supply gas stream. Alternatively, the controller 40 may call for passing the urea gasification products from thermal reactor 32 to be fed next to catalytic hydrolysis reactor 33.

The grid supply gas stream, which is the sum of the $NO_x$ reducing gas stream and the carrier gas stream, which are mixed, such as by mixing device 35 is fed to an injection grid 22. To achieve the advantages of efficient operation on combustors with wide temperature fluctuations, the inventive process also includes the step of determining the temperature of the gasification gases fed to the urea gasification unit 30 and the temperature of the stream of carrier gases in line 36'' and the means to carry it out. In addition, the inventive process requires monitoring all volumes and temperatures of incoming gas streams, e.g., at lines 36, 36' and 37, and determining if heating the gasification gases fed to the urea gasification unit via a heater 34 is necessary. If heating is necessary to assure that the grid supply gas stream is of a temperature sufficient to reduce $NO_R$ in the SCR reactor without causing deposits in the ducts or on the catalyst, the controller 40 will turn the heater on. And, it will turn it off when the need for heat has been abated.

In one preferred embodiment, a stream of combustion gases, e.g., line 36, is withdrawn from one or more predetermined locations on a combustor operated at a range of loads from low to high, wherein the combustion gases can vary within a range of at least about 200° F. between low load and high load.

In another embodiment, the gas stream comprising urea gasification products from thermal reactor 32 is fed through a hydrolysis catalyst to convert all urea-derived nitrogen species in the gases to ammonia.

In yet another embodiment, the gasification gases fed to the urea gasification unit 32 via line 36'' and the stream of carrier gases are both withdrawn from one or more predetermined locations on a combustor operated at a range of loads from low to high, wherein the combustion gases can vary within a range of at least about 200° F. between low load and high load. According to this embodiment, when the gases as withdrawn are at a temperature below about 400° F. the gasification gases fed to the urea gasification unit are heated as necessary by heater 34 prior to feeding to the thermal urea gasification reactor, and the $NO_R$-reducing gas stream from the thermal reactor 32 comprising urea gasification products, is fed through a hydrolysis catalyst 33 to convert all urea-derived nitrogen species in the gases to ammonia. In another aspect of this embodiment, the gases as withdrawn are above about 800° F. and no heating or hydrolysis are required. In yet another aspect of this embodiment, the gases as withdrawn are between about 400° F. and about 800° F., and the gasification gases fed to the urea gasification unit may require heating prior to feeding to the urea gasification unit. In each case, the controller 40 will determine when heater 34 should be turned on and to what extent.

In a preferred form, the process will sense the temperature of the stream of combustion gases is withdrawn from a predetermined location on the combustor and select from one of the following options: (a) the gases as withdrawn are above about 800° F., (b) the gases as withdrawn are between about 400° F. and about 800° F., and the gasification gases fed to the urea gasification unit are heated as called for by the controller 40 prior to feeding to the urea gasification unit, (c) the gases as withdrawn are below about 400° F., the gasification gases fed to the urea gasification unit are heated as called for by the controller 40 prior to feeding to the urea gasification unit and the $NO_R$-reducing gas stream comprising urea gasification products is fed through a hydrolysis catalyst to convert all urea-derived nitrogen species in the gases to ammonia.

The above description is for the purpose of teaching the person of ordinary skill in the art how to practice the invention. It is not intended to detail all of those obvious modifications and variations, which will become apparent to the skilled worker upon reading the description. It is intended, however, that all such obvious modifications and variations be included within the scope of the invention which is defined by the following claims. The claims are meant to cover the claimed components and steps in any sequence which is effective to meet the objectives there intended, unless the context specifically indicates the contrary.

What is claimed is:

1. A process for reducing the concentration of nitrogen oxides in combustion gases produced by a combustor operating with variations in load, by an SCR reactor effective for utilizing gasified urea, the process comprising:
   determining the concentration of $NO_x$ in the combustion gases,
   determining a required total gas flow necessary to supply the SCR reactor with $NO_x$ reducing and carrier gases from an injection grid to reduce $NO_x$ in the combustion gases to a predetermined level,
   feeding aqueous urea and gasification gases to a thermal urea gasification reactor in an amounts sufficient to produce a $NO_x$-reducing gas stream comprising urea gasification products in amounts sufficient to reduce $NO_x$ in the combustion gases,
   mixing the $NO_x$-reducing gas stream comprising urea gasification products with a stream of carrier gases to provide a grid supply gas stream, and
   feeding the grid supply gas stream to an injection grid,
   the process further including the step of
   determining the temperature of the gasification gases fed to the thermal urea gasification reactor and the temperature of the stream of carrier gases.

2. A process according to claim 1, including heating the gasification gases fed to the urea gasification unit as necessary to assure that the grid supply gas stream is of a temperature sufficient to reduce $NO_x$ in the SCR reactor.

3. A process according to claim 2, wherein flue gas is available from the combustor at a plurality of locations and a controller selects the location to provide a suitable temperature.

4. A process according to claim 1, wherein a stream of combustion gases is withdrawn from one or more predetermined locations on a combustor operated at a range of loads from low to high, and wherein the combustion gases can vary within a range of at least about 200° F. between low load and high load.

5. A process according to claim 1, wherein the gas stream comprising urea gasification products is fed through a hydrolysis catalyst to convert all urea-derived nitrogen species in the gases to ammonia.

6. A process according to claim 1, wherein the gasification gases fed to the urea gasification unit and the stream of carrier gases are withdrawn from one or more predetermined locations on a combustor operated at a range of loads from low to high, wherein the combustion gases can vary within a range of at least about 200° F. between low load and high load.

7. A process according to claim 6, wherein the combustion gases as withdrawn are below about 400° F., the gasification gases fed to the thermal urea gasification reactor are heated as necessary prior to feeding to the urea gasification unit and the gas stream comprising urea gasification products is fed through a hydrolysis catalyst to convert all urea-derived nitrogen species in the gases to ammonia.

8. A process according to claim 6, wherein the gases as withdrawn are above about 800° F.

9. A process according to claim 6, wherein the combustion gases as withdrawn are between about 400° F. and about 800° F., and the gasification gases fed to the urea gasification unit are heated as necessary prior to feeding to the urea gasification unit.

10. A process according to claim 6, wherein the temperature of the stream of combustion gases withdrawn from a predetermined location on the combustor is sensed and based on the temperature, one of the following options is selected: (a) the combustion gases as withdrawn are above about 800° F., (b) the combustion gases as withdrawn are between about 400° F. and about 800° F., and the gasification gases fed to the thermal urea gasification reactor are heated as necessary prior to feeding to the thermal urea gasification reactor, (c) the combustion gases as withdrawn are below about 400° F., the gasification gases fed to the thermal urea gasification reactor are heated as required prior to feeding to the thermal urea gasification reactor and the $NO_x$-reducing gas stream comprising urea gasification products is fed through a hydrolysis catalyst to convert all urea-derived nitrogen species in the gases to ammonia.

11. An apparatus for reducing the concentration of nitrogen oxides in combustion gases produced by a combustor operating with variations in load, by an SCR reactor effective for utilizing gasified urea, the process comprising:
  means for determining the concentration of $NO_x$ in the combustion gases,
  means for determining a required total gas flow necessary to supply the SCR reactor with $NO_x$ reducing and carrier gases from an injection grid to reduce $NO_x$ in the combustion gases to a predetermined level,
  means for feeding aqueous urea and gasification gases to a thermal urea gasification reactor in an amounts sufficient to produce a $NO_x$-reducing gas stream comprising urea gasification products in amounts sufficient to reduce $NO_x$ in the combustion gases,
  means for mixing the gas stream comprising urea gasification products with a stream of carrier gases to provide a grid supply gas stream, and
  means for feeding the grid supply gas stream to an injection grid,
  the apparatus further including means for determining the temperature of the gasification gases fed to the thermal urea gasification reactor and the temperature of the stream of carrier gases.

12. An apparatus according to claim 11, including heating the gasification gases fed to the urea gasification unit as necessary to assure that the grid supply gas stream is of a temperature sufficient to reduce $NO_x$ in the SCR reactor.

13. An apparatus according to claim 12, wherein flue gas is available from the combustor at a plurality of locations and a controller selects the location to provide a suitable temperature.

14. An apparatus according to claim 11, wherein a stream of combustion gases is withdrawn from one or more predetermined locations on a combustor operated at a range of loads from low to high, and wherein the combustion gases can vary within a range of at least about 200° F. between low load and high load.

15. An apparatus according to claim 11, wherein the gas stream comprising urea gasification products is fed through a hydrolysis catalyst to convert all urea-derived nitrogen species in the gases to ammonia.

16. An apparatus according to claim 11, wherein the gasification gases fed to the urea gasification unit and the stream of carrier gases are withdrawn from one or more predetermined locations on a combustor operated at a range of loads from low to high, wherein the combustion gases can vary within a range of at least about 200° F. between low load and high load.

17. An apparatus according to claim 16, wherein the combustion gases as withdrawn are below about 400° F., the gasification gases fed to the thermal urea gasification reactor are heated as necessary prior to feeding to the urea gasification unit and the gas stream comprising urea gasification products is fed through a hydrolysis catalyst to convert all urea-derived nitrogen species in the gases to ammonia.

18. An apparatus according to claim 16, wherein the gases as withdrawn are above about 800° F.

19. An apparatus according to claim 16, wherein the combustion gases as withdrawn are between about 400° F. and about 800° F., and the gasification gases fed to the urea gasification unit are heated as necessary prior to feeding to the urea gasification unit.

20. An apparatus according to claim 16, wherein the temperature of the stream of combustion gases withdrawn from a predetermined location on the combustor is sensed and based on the temperature, one of the following options is selected: (a) the combustion gases as withdrawn are above about 800° F., (b) the combustion gases as withdrawn are between about 400° F. and about 800° F., and the gasification gases fed to the thermal urea gasification reactor are heated as necessary prior to feeding to the thermal urea gasification reactor, (c) the combustion gases as withdrawn are below about 400° F., the gasification gases fed to the thermal urea gasification reactor are heated as required prior to feeding to the thermal urea gasification reactor and the $NO_x$-reducing gas stream comprising urea gasification products is fed through a hydrolysis catalyst to convert all urea-derived nitrogen species in the gases to ammonia.

* * * * *